United States Patent [19]

Broussard, Sr.

[11] Patent Number: 5,277,803
[45] Date of Patent: *Jan. 11, 1994

[54] WATER CLARIFICATION METHOD AND APPARATUS

[76] Inventor: Paul C. Broussard, Sr., 209 Constitution Dr., Maurice, La. 70555

[*] Notice: The portion of the term of this patent subsequent to Oct. 27, 2009 has been disclaimed.

[21] Appl. No.: 965,888

[22] Filed: Oct. 23, 1992

Related U.S. Application Data

[63] Continuation of Ser. No. 589,471, Sep. 28, 1990, Pat. No. 5,158,678.

[51] Int. Cl.$^5$ .................. B01D 17/035; C02F 1/24; C02F 1/40
[52] U.S. Cl. .................. 210/221.1; 210/221.2; 210/320; 210/322; 210/219; 210/201; 210/202; 209/170; 261/DIG. 75
[58] Field of Search .................. 210/220, 221.1, 221.2, 210/201, 202, 219, 319, 320, 322, 703; 209/170; 261/DIG. 75

[56] References Cited

U.S. PATENT DOCUMENTS

| | | | |
|---|---|---|---|
| 1,166,802 | 1/1916 | Albert | 210/320 |
| 1,346,817 | 7/1920 | Gahlh | 209/170 |
| 1,457,077 | 5/1923 | Janney | 209/168 |
| 1,807,823 | 6/1931 | Booth | 209/170 |
| 1,886,979 | 11/1932 | Ruth | 209/169 |
| 2,184,115 | 12/1939 | Coke | 209/169 |
| 2,316,770 | 4/1943 | Daman | 209/169 |
| 2,612,358 | 9/1952 | Daman | 209/169 |
| 2,994,432 | 8/1961 | Schluter | 210/101 |
| 3,477,581 | 11/1969 | Stearns | 210/221.2 |
| 3,972,815 | 8/1976 | O'Cheskey | 209/169 |
| 4,031,006 | 6/1977 | Ramirez | 210/221.2 |
| 4,049,553 | 9/1977 | Stebbins | 210/221.2 |
| 4,216,085 | 8/1980 | Chittenden | 210/221.2 |
| 4,220,612 | 9/1980 | Degner | 210/221.2 |
| 4,226,706 | 10/1980 | Degner | 210/221.2 |
| 4,255,262 | 3/1981 | O'Cheskey | 210/221.2 |
| 4,564,457 | 1/1986 | Cairo | 210/221.2 |
| 4,738,784 | 4/1988 | Sugihara | 210/221.2 |
| 4,782,789 | 11/1988 | Canzoneri | 210/221.2 |
| 4,800,025 | 1/1989 | Bibaeff | 210/320 |
| 4,824,579 | 4/1989 | George | 210/104 |
| 4,986,903 | 1/1991 | Canzoneri | 210/320 |
| 4,990,246 | 2/1991 | Blazejczak | 210/320 |
| 5,158,678 | 10/1992 | Broussard | 210/221.2 |
| 5,173,184 | 12/1992 | Krieger | 210/320 |

FOREIGN PATENT DOCUMENTS

| | | | |
|---|---|---|---|
| 996333 | 2/1983 | U.S.S.R. | 209/170 |
| 1322216 | 7/1987 | U.S.S.R. | 209/170 |

*Primary Examiner*—Thomas M. Lithgow
*Attorney, Agent, or Firm*—George A. Bode

[57] ABSTRACT

This invention pertains to a multi-stage separator vessel through which the to-be-cleaned fluid flows. Aeration assemblies within the inner cells disperse micro-fine gas bubbles into the fluid for cleaning purposes. Additionally, the inlet piping contains a separator that begins the separation process before this fluid is discharged into the first cell. An L-shaped passageway interconnects the various flotation cells of this separator with the entrance of each such passageway being at an elevation below its exit. A weir is located within each flotation cell that is adjustable as needed. This weir empties into a channel alongside the seprator vessel that collects the separated contaminants flowing over the weir for later disposal.

15 Claims, 5 Drawing Sheets

WATER CLARIFICATION METHOD AND APPARATUS

This is a continuation of application Ser. No. 07/589,471, filed Sep. 28, 1990, now U.S. Pat. No. 5,158,678.

BACKGROUND OF THE INVENTION

1. Field of the Invention

The present invention pertains to oil/water separators and, more specifically, to a system whereby such separation is accomplished by aeration as the fluid circulates through a series of interconnected flotation cells.

2. General Background

Oil/water separators have been widely used in the oil and gas industry, pulp and paper mills, municipal waste treatment facilities, and meat packing plants to name a few. There are many varieties ranging from the single cell assemblies to the multi-stage devices.

A typical version of the single cell assembly is disclosed in U.S. Pat. No. 3,986,954 to George, et al. This assembly incorporates a single U-shaped tank through which the fluid to be treated passes. A gas stream is injected into this tank and percolates through this fluid while the pressure of the fluid is increased. After such pressure is released, the gas breaks out of solution and attaches itself to any contaminants in the fluid, thereby separating these contaminants from the fluid.

Typical examples of multi-stage devices are disclosed in U.S. Pat. No. 4,226,706 to Degner, et al.; U.S. Pat. No. 4,564,457 to Cairo, Jr., et al.; and, U.S. Pat. No. 4,824,579 to George. Each of these devices incorporates a large tank that has been sub-divided into a series of smaller cells through which the fluid passes. Each cell is in open communication with it adjacent cell with each such cell having its own aeration system. In this manner, as the fluid flows from one cell to the next, it gradually becomes cleaner and clearer. In some cases, skimmer paddles are used to remove the aerated contaminants, in others, a central channel is employed to remove them.

In view of the above, it is an object of this invention to provide an improved multi-stage apparatus for separating oil and other contaminants from a fluid. Another object of this invention is to provide a means for separating such contaminants without the need for skimmer paddles and without a central channel. A further object of this invention is to begin the separation process prior to the introduction of the fluid to the first cell. Still another object of this invention is to provide a means of individually varying the amount of contaminants that are removed from each of the cells. Yet another object is to provide a means of transferring fluid between the individual cells which enhances the separation of the oil and/or solid contaminants from the fluid. These and other objects of this invention will become obvious upon further investigation.

SUMMARY OF THE PRESENT INVENTION

The preferred embodiment of the apparatus of the present invention solves the aforementioned problems in a straight forward and simple manner. What is provided is a separator vessel that is subdivided into a plurality of individual flotation cells by divider walls. These flotation cells are interconnected by passageways through each such divider wall thereby enabling fluid to pass from cell to cell. Each passageway is also configured so that its inlet is below its outlet. Each flotation cell contains a weir that empties into a channel located alongside the separator vessel. The contaminates, which are separated by flotation, rise to the surface of the fluid and are discharged through this weir into this channel for later disposal. Fluid inlet means supply the to-be-cleaned fluid to the first cell with the inlet means also comprising separator means that begin separating the contaminants from the fluid before it is discharged into the first cell. Each downstream cell (except, perhaps, for the last cell) contains aeration means that aerate the fluid as it flows through that cell. Upon completion of its journey through each of the cells, the now cleaned fluid is discharged from the separator vessel.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
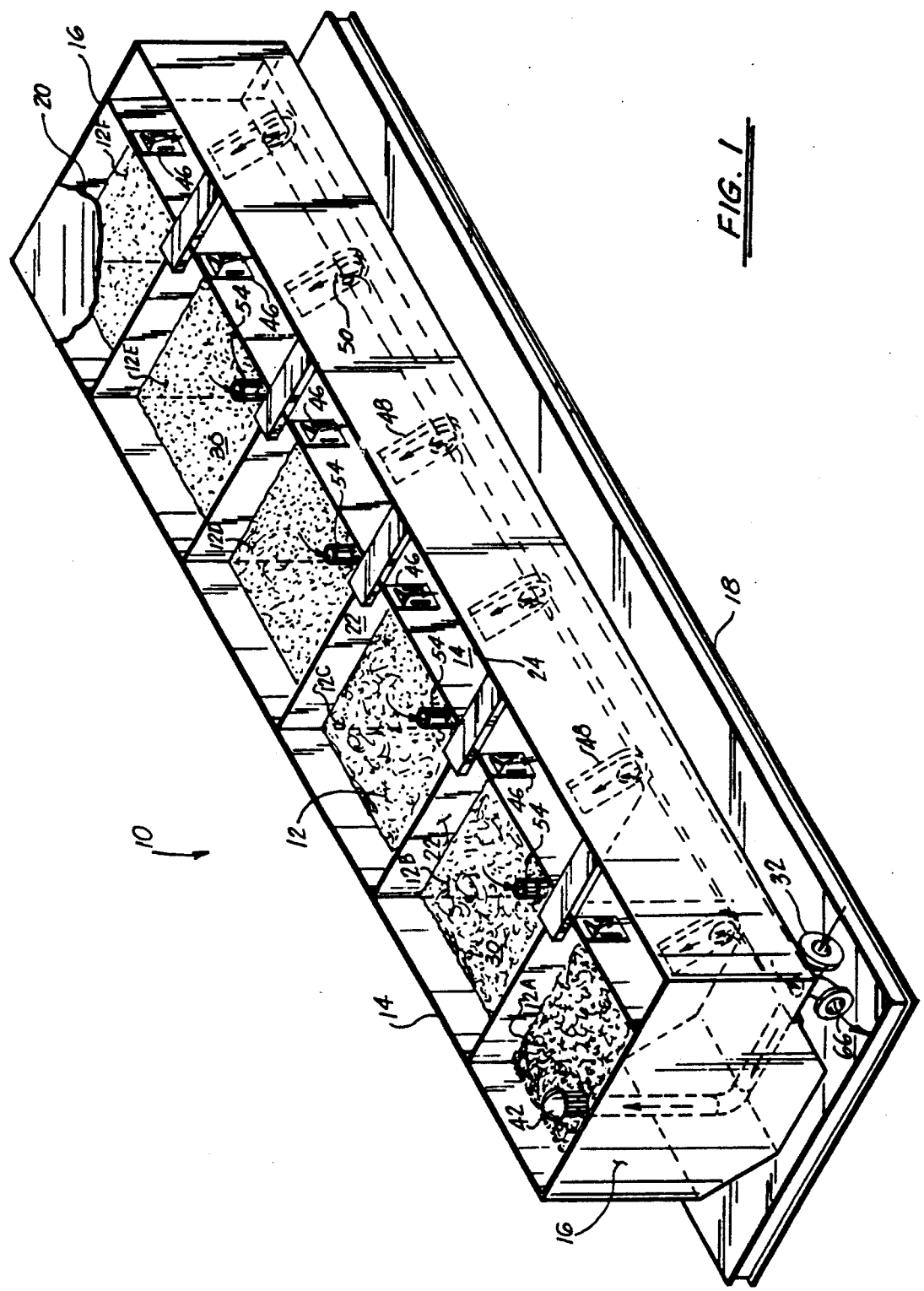
FIG. 1 is a pictorial view of the preferred embodiment of the present invention with the cover broken away and almost completely removed.
Figure 2:
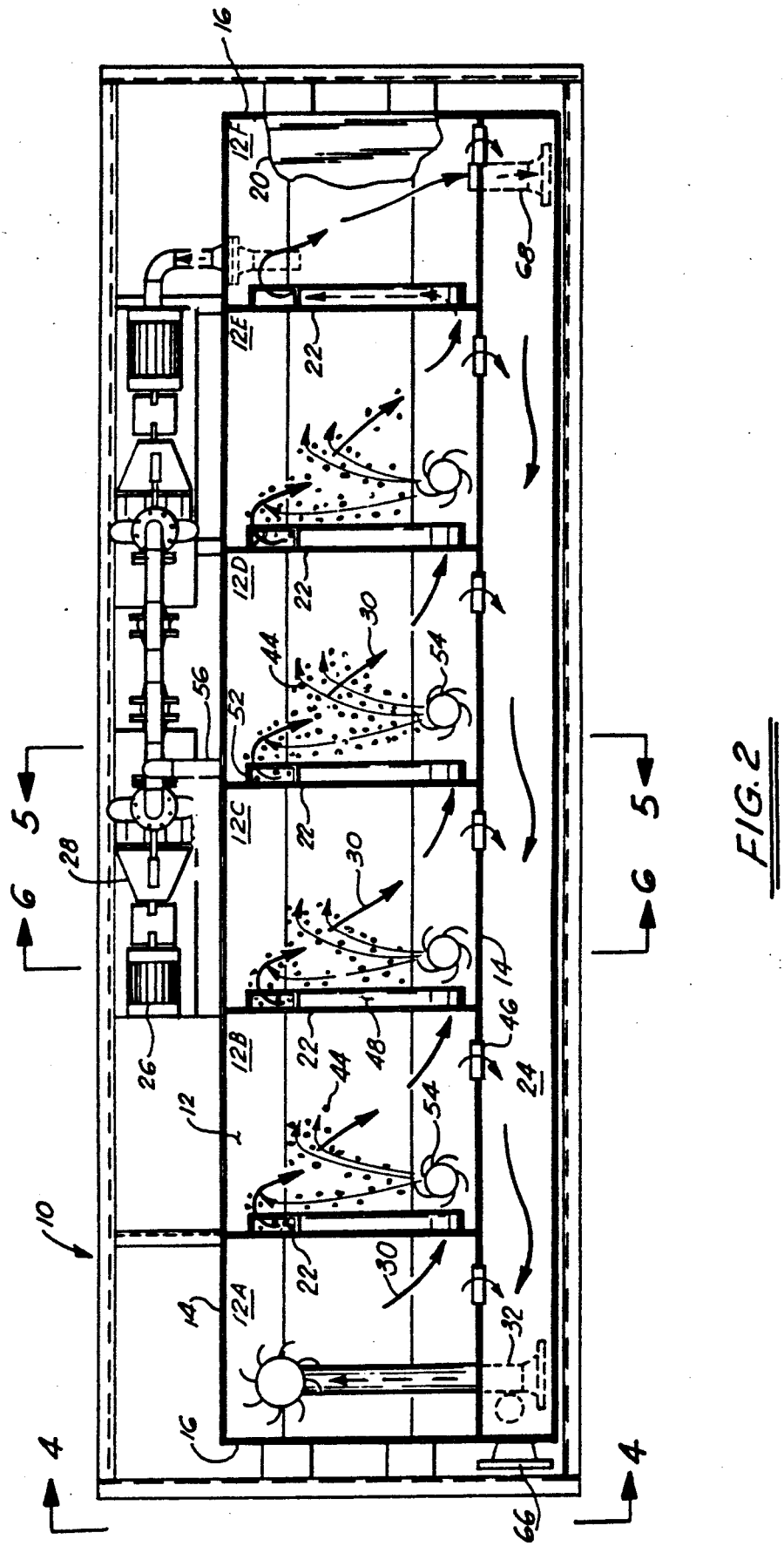
FIG. 2 is a top plan view of the embodiment of FIG. 1 with the cover removed.
Figure 3:
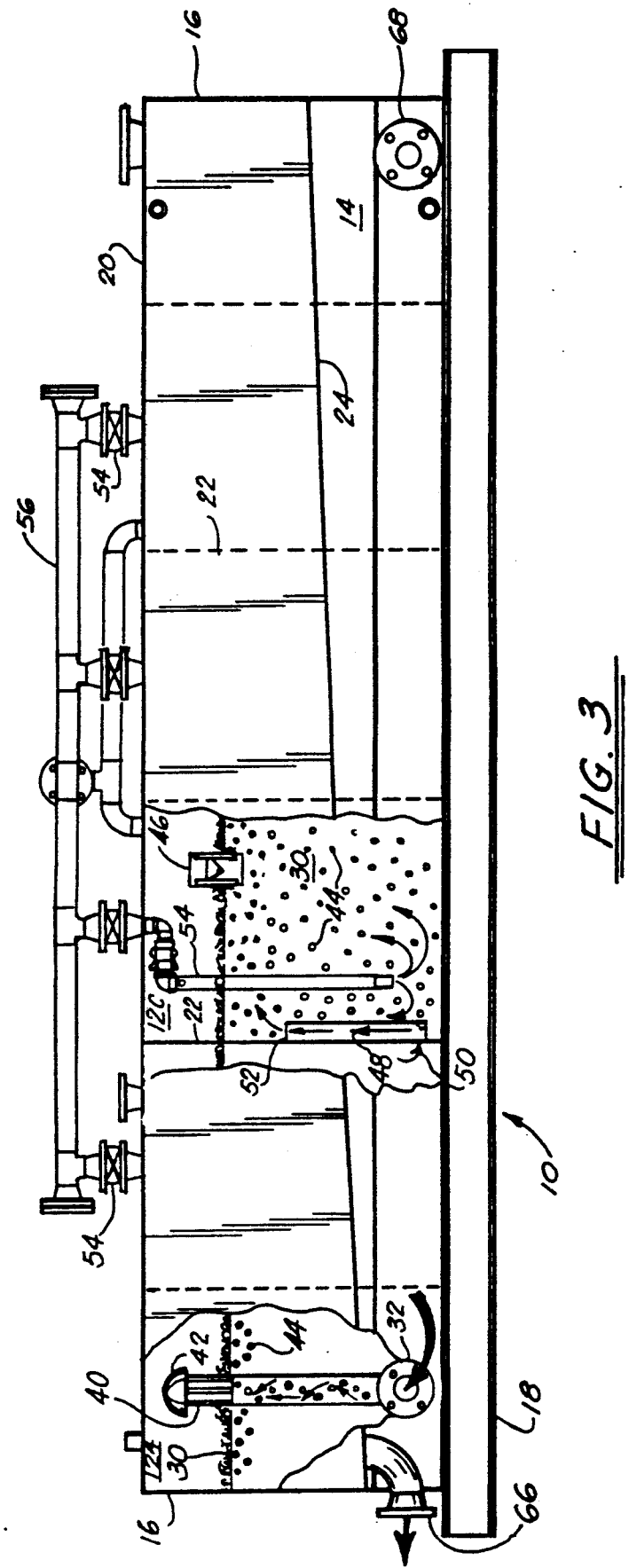
FIG. 3 is a side view, partially broken away, of the embodiment of FIG. 1.

Referring now to the drawing, and in particular FIGS. 1 through 3, the apparatus of the present invention is designated generally by the numeral 10. Apparatus 10 is generally described as an oil/water separator vessel 10 sub-divided into a plurality of individual flotation cells 12. Separator vessel 10 is sealed and includes sidewalls 14, end walls 16, bottom support 18, and top cover 20 (in an alternate embodiment, vessel 10 may be cylindrical). Within separator vessel 10 are a series of divider walls 22 that separate vessel 10 into the several individual and generally identical cells 12. Discharge channel 24 is secured along one sidewall 14 with this channel 24 being sloped for gravity flow. Alongside other sidewall 14 are motors 26, pumps 28 and other plumbing equipment necessary for operation.

The fluid 30 to be separated enters separator vessel 10 via inlet piping 32 which extends within first cell 12A. Contained within inlet piping 32 is a preliminary separator identified as SPIRALSEP 34 (FIG. 4) which begins the separation process while fluid 30 is still within piping 32 and before it enters first cell 12A. SPIRALSEP 34 operates much the same as a stationary screw conveyer or auger in that it includes a central shaft 36 having a spiral blade 38 fixedly secured thereto. The shaft 36 and blades 38 do not rotate. As contaminated liquid is forced into inlet piping 32 it is forced to spin about the central axis defined by shaft 36 thus separating the oil and vapor from the contaminated water owing to the different densities and centrifugal force created. Thus, the oil and vapor are driven toward the center of curvature or axis of rotation. Thus, the solids and the liquids that constitute fluid 30 are physically forced along inlet piping 32 so as to prevent sludge from collecting and/or settling within this piping. Additionally, this movement along piping 32 breaks up any large solids into smaller particles for better separation within vessel 10. This rotation also separates the contaminants from fluid 30 by centrifugal force. Furthermore, SPIRALSEP 34 utilizes entrained gas bubbles to scrub this incoming fluid 30, thereby creating an immediate frothing action within both piping 32 and first cell 12A. This initial frothing action permits the separation process within cell 12A to be more efficient, thereby reducing the load on the remaining cells 12B through 12F.

Figure 4:
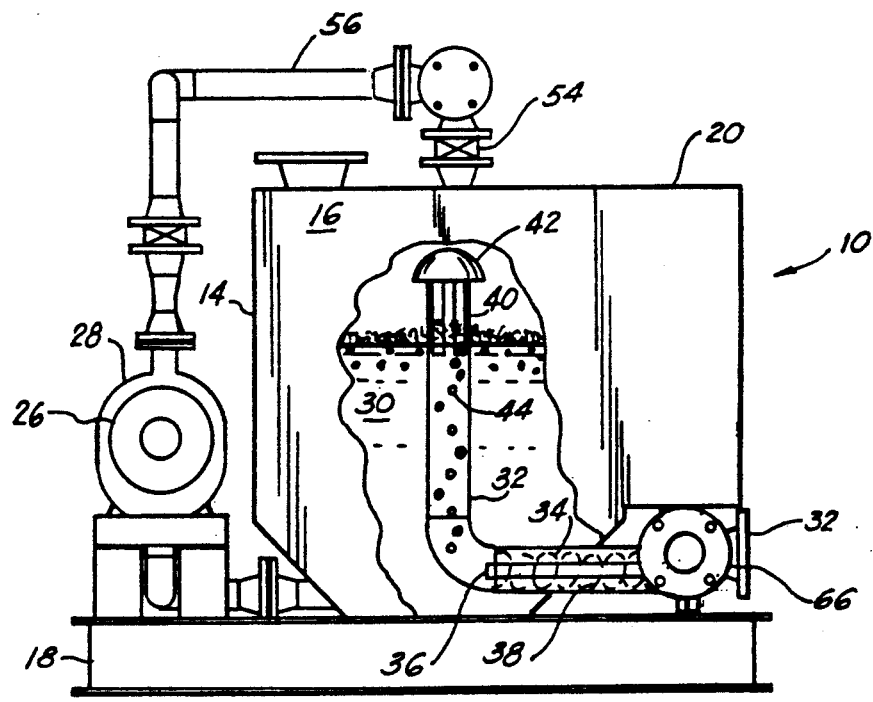
FIG. 4 is a sectional view, partially broken away, taken along LINES 4—4 of FIG. 2.

As best shown in FIG. 4, fluid 30 is directed above the normal fluid level via inlet piping 32 before it is discharged into first cell 12A through orifice 40. Orifice 40 is configured with cap or umbrella 42 which evenly spreads fluid 30 throughout cell 12A while still retaining the froth and/or foam resulting from SPIRALSEP 34. As can be surmised, the tiny gas bubbles 44 introduced by SPIRALSEP 34 attach to the solid and/or oil particles within fluid 30 causing them to rise to the surface. The foam then travels along the fluid surface towards weir 46 in sidewall 14. Afterwards, should the level of fluid 30 be high enough, this foam is discharged into channel 24 through weir 46. As discussed in greater detail below, the height of weir 46 is adjustable as needed.

Figure 5:
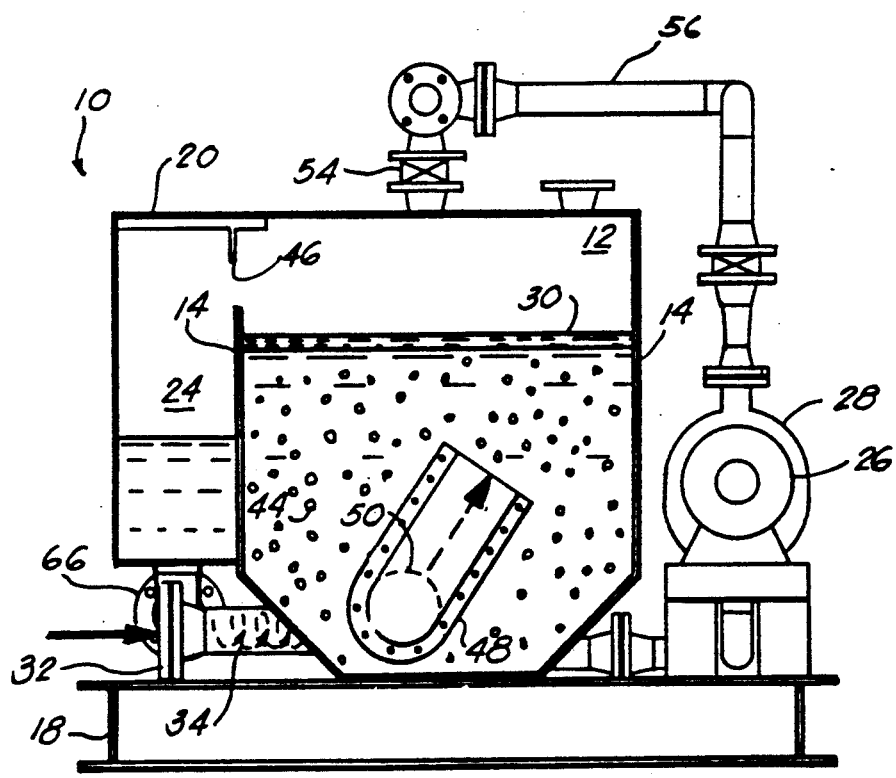
FIG. 5 is a sectional view taken along LINES 5—5 of FIG. 2.

The fluid 30 remaining within first cell 12A travels near the bottom of this cell towards divider wall 22 where it passes through L-shaped baffle 48 into the next adjacent cell 12B (FIGS. 2, 3 and 5). Inlet opening 50 of L-shaped baffle 48 is located slightly above the bottom of cell 12A so as to prevent the entrance of heavy solids that have sunk to the bottom of this cell. Additionally, L-shaped baffle 48 is configured having its exit opening 52 at an elevation above its inlet opening 50 so as to also prevent the movement of heavy solids from one cell to the next. Furthermore, L-shaped baffle 48 is angled such that exit 52 is located near the sidewall 14 opposite from weir 46 while inlet 50 is generally positioned nearer the sidewall 14 containing weir 46, and, in this embodiment, inlet 50 is located generally underneath weir 46. With this configuration, the entrance into each cell 12 is located diagonally opposite (in three dimensions) from the exit from this cell 12, thereby providing a fluid path along the longest possible distance within each cell 12 for maximum cleaning and/or separation. Also, the upward discharge configuration of L-shaped baffle 48 aids in coalescing the oil droplets within fluid 30 because as the flow exits each L-shaped baffle 48, the oil is allowed to remain on the fluid surface due to micro-fine gas bubbles 44.

Figure 7:
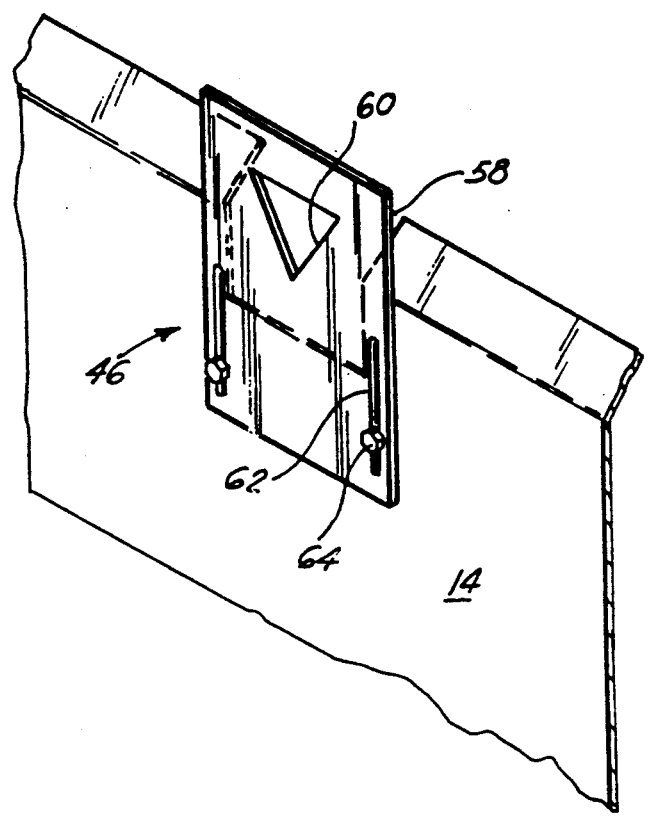
FIG. 7 is a pictorial view, partially broken away, of the weir of the embodiment of FIG. 1.
Figure 6:
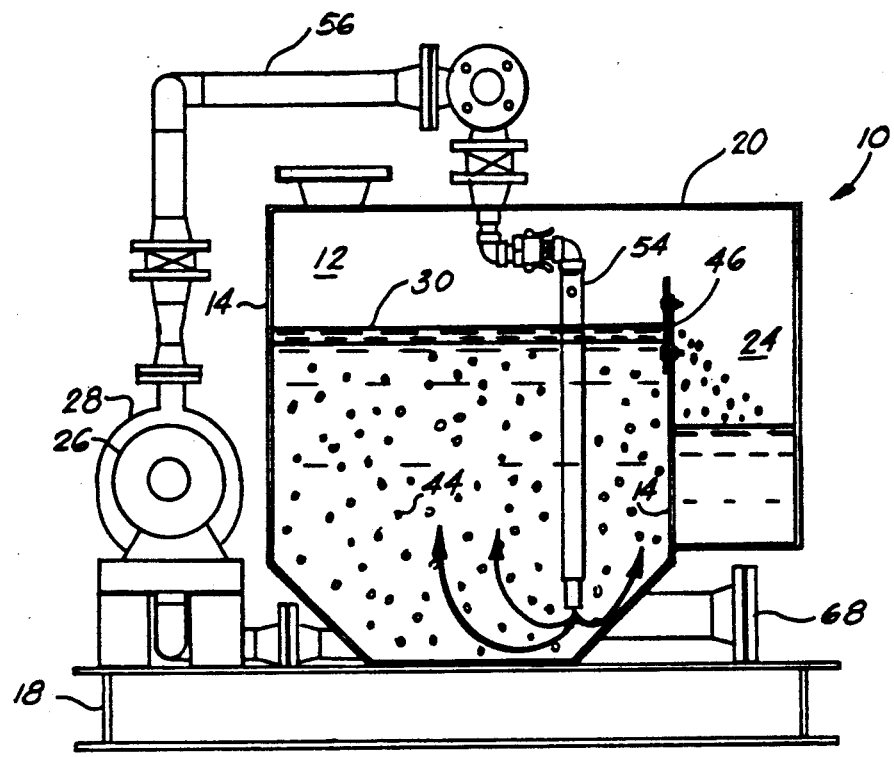
FIG. 6 is a sectional view taken along LINES 6—6 of FIG. 2.

FIG. 6 best illustrates eductor or aeration assembly 54 which introduces micro-fine gas bubbles 44 into each of cells 12B, 12C, 12D and 12E (i.e., all but the first and last cells 12A and 12F) for separation purposes. Eductor assembly 54 operates in the typical fashion by withdrawing a slight amount of fluid 30 from the last cell 12F and then discharging this said withdrawn fluid, along with micro-fine gas bubbles 44, into earlier cells 12B through 12E. This eductor assembly 54 is of quick disconnect construction for ease of orifice removal and to permit rapid orifice changes to compensate for varying flow conditions. In this preferred embodiment, the orifice is located at the end of piping 56 which extends downward nearly to the tapered bottom of each cell 12 (FIG. 6). This creates a flow pattern that directs the existing foam and any newly added solids toward weir 46. Pump 28 and motor 26 supply the necessary pressure to force these micro-fine bubbles 44 through piping 56. As indicated earlier, micro-fine bubbles 44 attach themselves to any solids or oil occurring in fluid 30, thereby causing these contaminates to rise to the surface with this foam gradually floating towards weir 46 for discharge into channel 24. The fluid 30 remaining within each cell 12 slowly gravitates towards L-shaped baffle 48 so as to flow into the next adjacent cell for further cleaning FIG. 7 illustrates in greater detail the configuration of weir 46. In this embodiment, weir 46 consists of plate 58 having a V-shaped notch 60 therein and a pair of oppositely spaced slide holes 62. Plate 58 is secured to sidewall 14 via bolts 64 which extend through slide holes 62 as shown. In this fashion, the height of V-shaped notch 60 can be adjusted as needed with respect to sidewall 14 and the level of fluid 30 within each cell 12.

The portion of fluid 30 that flows over weir 46 is collected within channel 24 and transported elsewhere via sludge outlet 66 (channel 24 is sloped upwardly from first cell 12A to last cell 12F for gravity flow to outlet 66). The portion of fluid 30 that remains within separator vessel 10 eventually makes its way into last cell 12F where this now cleaned and separated fluid is discharged via outlet 68. Cover 20 positively seals separator vessel 10, thereby retaining fluid 30 within this vessel. In this embodiment, but not shown, gasket material is located in a channel on the underneath side of cover 20 to seal vessel 10 against a coaming on the vessel top.

Oil/water separator vessel 10 can be made available in a variety of sizes from around 1,000 BPD (30 GPM) up to 200,000 BPD (6,000 GPM) or more. Additionally, vessel 10 can be reshaped to fit available space without sacrificing efficiency or performance.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for clarifying a liquid comprising:
   (a) a separator vessel subdivided into at least three flotation cells by divider walls;
   (b) a passageway through each said divider wall enabling liquid to pass therethrough, the inlet of each of said passageways being at an elevation below that of the exit of said passageway and the inlet of each of said passageways being positioned closer to one of said side walls of each of said flotation cells than the exit of said passageway;
   (c) a weir movably secured to and forming a part of said one of the side walls of each said flotation cell;
   (d) a discharge channel mounted along said one of said side walls of said separator vessel and selectively being in fluid communication with each of said floatation cells by the selective movement of said weirs;
   (e) liquid inlet means for supplying liquid to a first said cell, said inlet means comprising separator means for initiating the separation of contaminates from said liquid before said liquid is discharged into said first oil; and, (f) aeration means in at least one cell intermediate said first and last cells for aerating said liquid as it flows through said cells and before it is discharged from said separator vessel, said aeration means including means connected to the last of said cells for withdrawing liquid from said last cell and discharging this said liquid upstream into said at least one intermediate cell with the discharge of aeration gas into the same said at least one intermediate cell.

2. The apparatus of claim 1, wherein said separator vessel is subdivided into approximately equal and identical cells.

3. The apparatus of claim 2, wherein the inlets of said passageways are near the bottom of said divider walls and the exits of said passageways are near the top of said divider walls.

4. The apparatus of claim 3, wherein said passageway inlets are adjacent a first wall of said separator vessel and wherein said passageway exits are adjacent a second wall opposite said first wall of said separator vessel.

5. The apparatus of claim 4, wherein said passageway inlets are adjacent said side wall containing said weir.

6. The apparatus of claim 1, wherein said discharge channel is sloped for gravity flow from downstream cells toward upstream cells.

7. The apparatus of claim 1, wherein said separator means introduce micro-fine gas bubbles into and thereby aerate said liquid before said liquid is discharged into said first cell.

8. The apparatus of claim 1, wherein said separator means initiates the separation of said contaminates from said liquid by application of centrifugal force to said liquid before said liquid is discharged into said first cell.

9. An apparatus for clarifying a liquid comprising:

(a) a separator vessel subdivided into at least three flotation cells by divider walls;

(b) a passageway through each said divider wall enabling liquid to pass therethrough, the inlet of each of said passageways being at an elevation below that of the exit of said passageway and the inlet of each of said passageways being positioned closer to one of said side walls of each of said flotation cells than the exit of said passageway;

(c) a weir movably secured to and forming a part of said one of the side walls of each said flotation cell;

(d) a discharge channel mounted along said one of said side walls of said separator vessel and selectively being in fluid communication with each of said floatation cells by the selective movement of said weirs;

(e) liquid inlet means for supplying liquid to a first said cell, said inlet means comprising separator means for initiating the separation of contaminates from said liquid by application of centrifugal force to said liquid before said liquid is discharged into said first cell; and (f) aeration means in at least one cell intermediate said first and last cell for aerating said liquid as it flows through said cells and before it is discharged from said separator vessel, said aeration means having its outlet disposed in said at least one intermediate cell closer to said one of said side walls on which said weir is secured than to a side wall opposite said one of said side walls, and, including means connected to the last of said cells for withdrawing liquid from said last cell and discharging this said liquid upstream into said at least one intermediate cell with the discharge of aeration gas into the same said at least one intermediate cell.

10. The apparatus of claim 9, wherein said separator vessel is subdivided into approximately equal and identical cells.

11. The apparatus of claim 10, wherein the inlets of said passageways are near the bottom of said divider walls and the exits of said passageways are near the top of said divider walls.

12. The apparatus of claim 11, wherein said passageway inlets are adjacent said one of the side walls of said separator vessel and wherein said passageway exits are adjacent a second side wall opposite said one of the side walls of said separator vessel.

13. The apparatus of claim 12, wherein said passageway inlets are adjacent said side wall containing said weir.

14. The apparatus of claim 9, wherein said discharge channel is sloped for gravity flow from downstream cells toward upstream cells.

15. The apparatus of claim 9, wherein said separator means introduce micro-fine gas bubbles into and thereby aerate said liquid before said liquid is discharged into said first cell.

* * * * *